(12) United States Patent
Yang Mao et al.

(10) Patent No.: US 10,262,242 B2
(45) Date of Patent: Apr. 16, 2019

(54) IMAGE SCANNING SYSTEM AND IMAGE SCANNING METHOD

(71) Applicant: Industrial Technology Research Institute, Hsinchu (TW)

(72) Inventors: Shys-Fan Yang Mao, Hsinchu (TW); Tian-Yan Ma, Hsinchu (TW); Fan-Yi Lin, Hsinchu (TW)

(73) Assignee: Industrial Technology Research Institute, Hsinchu (TW)

( * ) Notice: Subject to any disclaimer, the term of this patent is extended or adjusted under 35 U.S.C. 154(b) by 245 days.

(21) Appl. No.: 15/468,952

(22) Filed: Mar. 24, 2017

(65) Prior Publication Data

US 2018/0107904 A1 Apr. 19, 2018

(30) Foreign Application Priority Data

Oct. 19, 2016 (TW) .............................. 105133686 A (51) Int. Cl.
*G06K 9/62* (2006.01)
*G06T 7/11* (2017.01)
*G06K 9/20* (2006.01)
*G01S 17/89* (2006.01)
*G01S 7/48* (2006.01)
(Continued)

(52) U.S. Cl.
CPC .......... *G06K 9/6288* (2013.01); *G01S 7/4808* (2013.01); *G01S 7/4972* (2013.01); *G01S 17/023* (2013.01); *G01S 17/89* (2013.01); *G06K 9/00369* (2013.01); *G06K 9/209* (2013.01);
(Continued)

(58) Field of Classification Search
CPC .......... G06K 9/6288; G06K 9/58; G06T 5/50; G01S 7/4808
See application file for complete search history.

(56) References Cited

U.S. PATENT DOCUMENTS

| 8,861,842 B2 | 10/2014 | Jung et al. |
| 9,183,459 B1 | 11/2015 | Zhang et al. |

(Continued)

FOREIGN PATENT DOCUMENTS

| CN | 105403893 A | 3/2016 |
| TW | I358606 B | 2/2012 |
| TW | I451064 B | 9/2014 |

OTHER PUBLICATIONS

Park, Yoonsu, et al., "Calibration between Color Camera and 3D LIDAR Instruments with a Polygonal Planar Board," V. 14.3 (2014) pp. 5333-5353.

*Primary Examiner* — Tsion B Owens
(74) *Attorney, Agent, or Firm* — Mintz Levin Cohn Ferris Glovsky and Popeo, P.C.; Peter F. Corless; Steven M. Jensen (57) ABSTRACT

The present disclosure provides an image scanning system and an image scanning method. The image scanning method includes: receiving a first image of a first optical device and a second image of a second optical device; determining objects of the first image or the second image; selecting at least one of the objects of the first image or the second image as a region of interest to scan the region of interest continuously by the second optical device so as to obtain depth image information of the region of interest; and integrating the depth image information into the first or second image. Therefore, the present disclosure obtains higher image resolutions, faster scanning speeds and more accurate recognition results.

20 Claims, 7 Drawing Sheets

(51) Int. Cl.
 *G06K 9/00* (2006.01)
 *G06K 9/46* (2006.01)
 *G01S 17/02* (2006.01)
 *G01S 7/497* (2006.01)

(52) U.S. Cl.
 CPC ....... *G06K 9/4642* (2013.01); *G06K 9/00805* (2013.01)

(56) References Cited

U.S. PATENT DOCUMENTS

| | | |
|---|---|---|
| 9,215,382 B1 | 12/2015 | Hilde |
| 9,315,192 B1 | 4/2016 | Zhu et al. |
| 9,883,169 B2 * | 1/2018 | Koehle .................. G06T 7/593 |
| 10,108,867 B1 * | 10/2018 | Vallespi-Gonzalez ....................... G06K 9/00805 |
| 2011/0090135 A1 | 4/2011 | Tricoukes et al. |
| 2012/0020523 A1 * | 1/2012 | Ikeda .................. G01B 11/005 382/103 |
| 2012/0035846 A1 * | 2/2012 | Sakamoto ........... B60T 8/17558 701/301 |
| 2012/0236379 A1 | 9/2012 | da Silva et al. |
| 2015/0260844 A1 | 9/2015 | Sebastian et al. |
| 2018/0017379 A1 * | 1/2018 | Nakagawa ............. G01B 11/24 |

* cited by examiner

IMAGE SCANNING SYSTEM AND IMAGE SCANNING METHOD

CROSS-REFERENCE TO RELATED APPLICATION

This application claims the priority benefit of Taiwan Application No. 105133686, filed on Oct. 19, 2016. The entirety of the above-mentioned patent application is hereby incorporated by reference herein.

BACKGROUND

1. Technical Field

The present disclosure relates to image scanning systems and image scanning methods, and, more particularly, to an image scanning system and an image scanning method that scan in a high resolution a particular object in an image.

2. Description of Related Art

The advances in 3-dimension (3D) visual technology has enabled it to be widely applied to various fields, such as collision avoidance, robotics, unmanned aerial vehicles, safety monitoring, smart home, intelligent city, maritime safety, etc. The requirements of these systems are becoming more and more demanding, and high-precision detection is required even under different lighting conditions.

However, depth sensors based on camera images in the prior art, whether using a stereo camera or a structured light, are susceptible to surrounding light sources, which may lead to issue of low recognitions of objects in the images. Moreover, 3D depth information has resolution reduced as a distances or a field of view increases.

Therefore, there is a need for a high-resolution image scanning technique that addresses the aforementioned issues in the prior art.

SUMMARY

One embodiment of the present disclosure provides an image scanning system, which may include: a first optical device configured for obtaining a first image; a second optical device configured for obtaining a second image; and a processing unit configured for receiving and processing at least one of the first image and the second image. The processing unit may include: an object detection module configured for detecting one or more objects in the first image or the second image; a coordinate calculation module configured for selecting at least one of the objects in the first image or the second image as a region of interest (ROI) and calculating a relative coordinate of the ROI with respect to the second optical device; a control module configured for controlling the second optical device based on the relative coordinate to continuously scan the ROI in the first image or the second image and allowing the processing unit to generate depth image information of the ROI in the first image or the second image; and an image integration module configured for integrating the depth image information into the first image or the second image.

Another embodiment of the present disclosure provides an image scanning method, which may include: obtaining a first image in a field of view of a first optical device and a second image in a field of view of a second optical device; detecting, by an object detection module of a processing unit, one or more objects in at least one of the first image and the second image; selecting, by a coordinate calculation module of the processing unit, at least one of the objects in the first image or the second image as a region of interest (ROI) and calculating, by the coordinate calculation module of the processing unit, a relative coordinate of the ROI with respect to the second optical device; controlling, by a control module of the processing unit, the second optical device based on the relative coordinate to continuously scan the ROI in the first image or the second image, and allowing the processing unit to generate depth image information of the ROI in the first image or the second image; and integrating, by an image integration module of the processing unit, the depth image information into the first image or the second image.

DETAILED DESCRIPTION OF THE EMBODIMENTS

The present disclosure is described by the following specific embodiments. Those with ordinary skills in the arts can readily understand other advantages and functions of the present disclosure from this specification. The present disclosure may also be practiced or applied with different implementations other than those described herein.

Figure 1A:
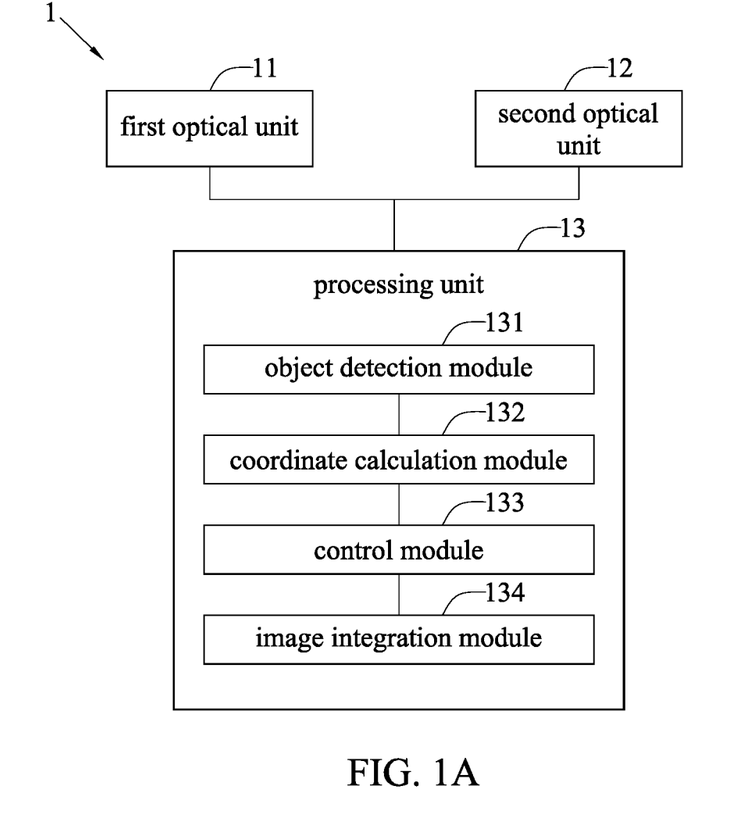
FIG. 1A is a block diagram depicting an image scanning system in accordance with a first embodiment of the present disclosure.

Referring to FIG. 1A, an image scanning system 1 according to a first embodiment of the present disclosure includes a first optical device 11, a second optical device 12, and a processing unit 13. The first optical device 11 is used for obtaining a first image in the field of view of the first optical device 11. The second optical device 12 is used for obtaining a second image in the field of view of the second optical device 12.

In an embodiment, the first optical device 11 is a camera, and the second optical device 12 is a three-dimensional (3D) Light Detection and Ranging (LiDAR) sensor. The first image obtained by the first optical device 11 is a two-dimensional (2D) image, while the second image obtained by the second optical device 12 is a 3D image with depth image information.

The processing unit 13 is used for receiving the first image or the second image. The processing unit 13 includes an object detection module 131, a coordinate calculation module 132, a control module 133, and an image integration module 134. In an embodiment, the processing unit 13 is a processor in a computer, a mobile phone, a tablet, a server, or any other electronic devices. The term "module" used herein refers to a software program executed by the processor to implement a particular function.

Figure 1B:
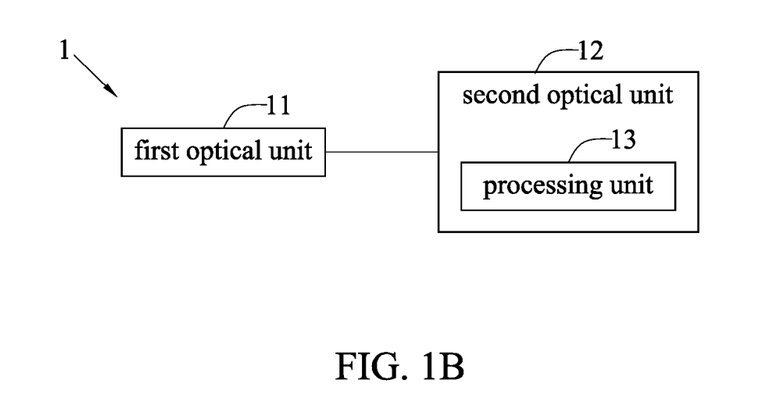
FIG. 1B is a block diagram depicting an image scanning system in accordance with another embodiment of the present disclosure.

In another embodiment, referring to FIG. 1B, the processing unit 13 is disposed in the second optical device 12. In yet another embodiment, the processing unit 13 is a processor in the second optical device 12. The term "module" (e.g., the term "module" in the object detection module 131, the coordinate calculation module 132, the control module 133, and the image integration module 134) used herein refers to a firmware. FIG. 1A differs from FIG. 1B in the location of the processing unit 13.

The object detection module 131 is used for detecting an object in the first image or the second image. In an embodiment, an algorithm used by the object detection module 131 for detecting an object is based on Histogram of Oriented Gradient (HOG). In another embodiment, in order to increase the recognition rate, the HOG-based algorithm can be used in conjunction with a Support Vector Machine (SVM), a Bag-of-Words Model (Bow), or a combination thereof, or in conjunction with a deep learning (machine learning) algorithm such as an artificial neural network, AlexNet, or R-CNNs, allowing the object detection module 131 to more accurately detect objects in an image. The present disclosure does not limit the types of algorithms employed by the object detection module 131.

Figure 3A:
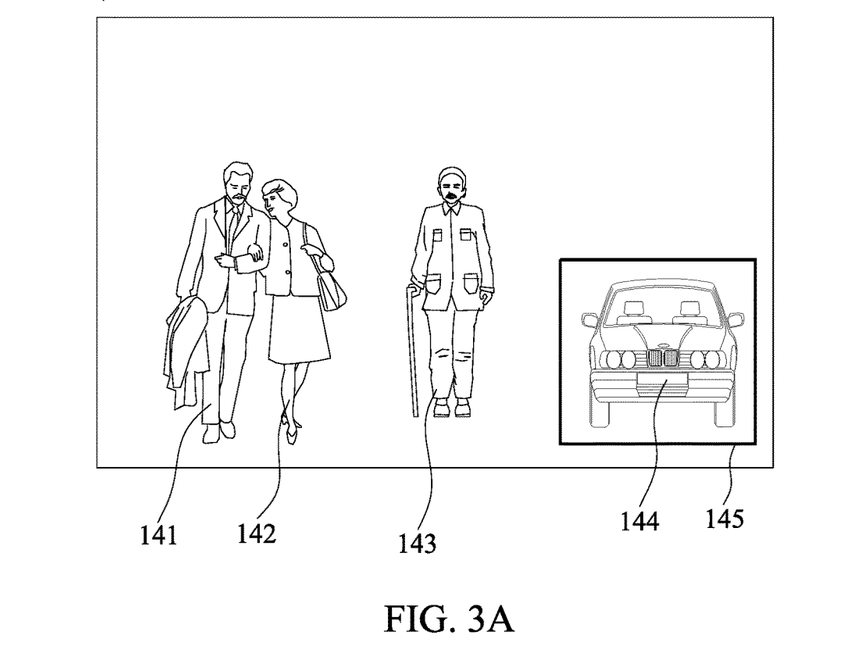
FIG. 3A is a schematic diagram depicting a region of interest in an image obtained by an image scanning system in accordance with the present disclosure.

In an embodiment, referring to FIG. 3A, an image 14 (such as the first image obtained by the first optical device 11) includes a plurality of objects 141, 142, 143 and 144 detected by the object detection module 131. The coordinate calculation module 132 is used for selecting at least one of the objects 141, 142, 143 and 144 in the image 14 as a region of interest (ROI). As seen in FIG. 3A, the coordinate calculation module 132 has selected the object 144 (e.g., a car) as a ROI 145.

In an embodiment, the object 144 in the image 14 is selected as the ROI 145. Selection criteria may vary in accordance with various actual requirements. For example, in a vehicle collision avoidance system, an object such as a car or a motorbike in an image is selected as the ROI. As another example, in a safety monitoring system, an object such as a person in an image is selected as the ROI. The present disclosure is not so limited.

Figure 3B:
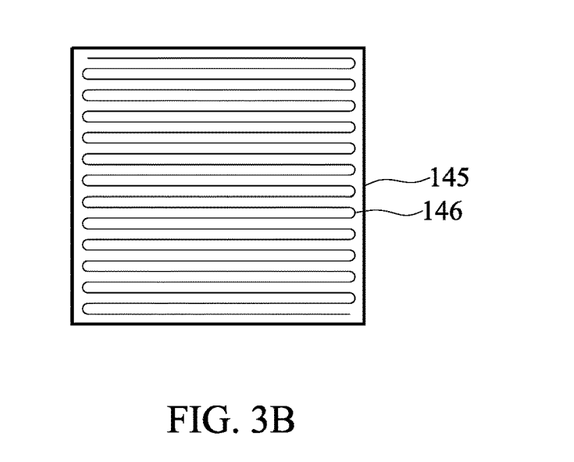
FIG. 3B is a schematic diagram depicting a path of laser light emitted by a second optical device in the image scanning system to scan a region of interest in accordance with the present disclosure.

The coordinate calculation module 132 calculates a relative coordinate between the ROI 145 and the second optical device 12. The term "relative coordinate" refers to the coordinate of the ROI 145 in the image 14 with respect to the coordinate system used by the second optical device 12. As such, the control module 133 can then control the second optical device 12 to scan the ROI 145 in the image 14 continuously based on the relative coordinate, such that the processing unit 13 can generate depth image information of the ROI 145 in the image 14. Continuous scanning, as shown in FIG. 3B, creates a path 146 of multi-point scanning in the ROI 145. Since the scanning points and density are increased, the resolution of the depth image information of the object 144 obtained in the ROI ·.·can be increased. The present disclosure does not limit the shape of the path 146.

Figure 4:
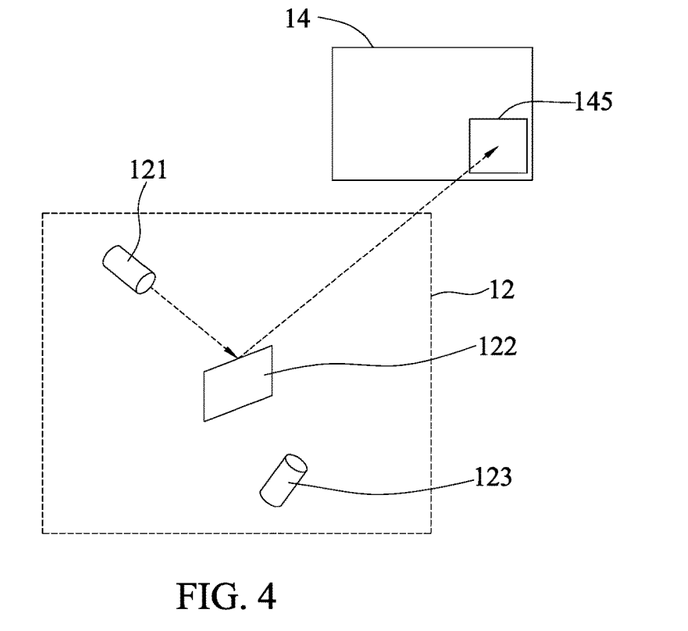
FIG. 4 is a diagram illustrating the operation of the second optical device in accordance with an embodiment of the present disclosure.

Moreover, referring to FIG. 4, a hardware architecture and a method employed by the second optical device 12 for continuously scanning the ROI 145 in the image 14 in accordance with an embodiment of the present disclosure are explained in details. The second optical device 12 includes a laser light emitter 121, a reflector 122, and an image receiver 123. The laser light emitter 121 is used for emitting laser light. The reflector 122 is in a path along which the laser light travels. In other words, the laser light emitter 121 emits laser light towards the reflector 122, such that the reflector 122 reflects the laser light. A change in the angle of the reflector 122 results in an adjustment of the path of the laser light. In other words, the location that the laser light is incident onto an actual object in the ROI 145 of the image 14 can be adjusted. After the laser light is incident onto and reflected by the actual object, the reflected laser light can be received by the image receiver 123, such that the second optical device 12 can obtain depth image information of the actual object in the ROI 145 of the image 14.

In an embodiment, the control module 133 calculates the angles at which the second optical device 12 will scan the ROI 145 in the image 14, and produces voltages of the second optical device 12 for controlling the angles of the reflector 122 to adjust the path of the laser light, so as to continuously scan the ROI 145 in the image 14.

Figure 5:
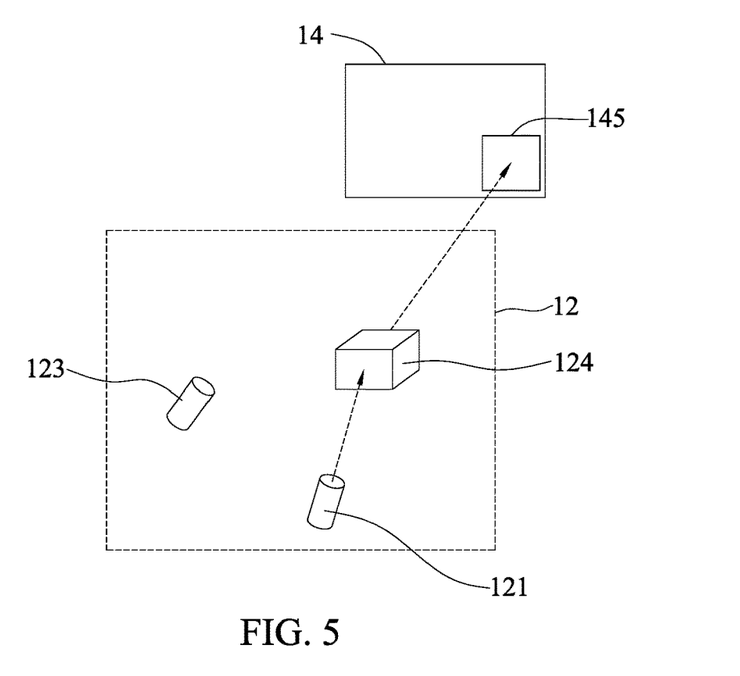
FIG. 5 is a diagram illustrating the operation of the second optical device in accordance with another embodiment of the present disclosure.

In another embodiment, referring to FIG. 5, the second optical device 12 includes the laser light emitter 121, a solid state laser beam guider 124, and the image receiver 123. The laser light emitter 121 is used for emitting laser light to the solid state laser beam guider 124. The solid state laser beam guider 124 uses a liquid crystal waveguide or an optical phased array to adjust the path of the laser light, and adjust the location where the laser light is incident onto an actual object in the ROI 145 of the image 14. After the laser light is incident onto and reflected by the actual object, the reflected laser light can be received by the image receiver 123, such that the second optical device 12 can obtain depth image information of the actual object in the ROI 145 of the image 14.

In another embodiment, the control module 133 controls the solid state laser beam guider 124 based on the relative coordinate. The angles of the emitted laser light are adjusted accordingly, such that the ROI 145 in the image 14 is continuously scanned.

Figure 6:
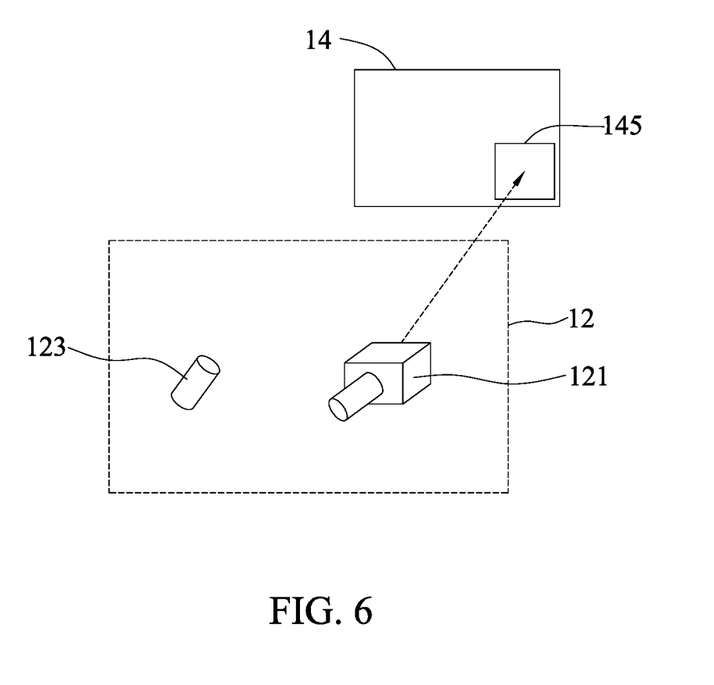
FIG. 6 is a diagram illustrating the operation of the second optical device in accordance with still another embodiment of the present disclosure.

In yet another embodiment, referring to FIG. 6, the second optical device 12 includes the image receiver 123 and the laser light emitter 121. The laser light emitter 121 is an active scanning laser light emitter. The control module 133 adjusts the path of the laser light emitted by the laser light emitter 121 based on the relative coordinate, such that the laser light can be incident onto the actual object in the ROI 145 of the image 14. After the laser light is incident onto and reflected by the actual object, the reflected laser light can be received by the image receiver 123, such that the second optical device 12 can obtain depth image information of the actual object in the ROI 145 of the image 14.

Upon obtaining the depth image information of the actual object in the ROI 145 of the image 14, the image integration module 134 integrates the depth image information into the first image or the second image, and the depth image information of the object is superimposed on an area where the same object resides in the first image or the second image, thereby obtaining an image including high-resolution depth image information of the object for subsequent recognition. In turn, a more accurate result can be obtained.

The image 14 in another embodiment is a 2D image obtained by the camera. If the quality of the image 14 is poor or the image 14 is unrecognizable, a 3D image obtained by the 3D LiDAR sensor can be used as the image 14 instead, to allow the object detection module 131, the coordinate calculation module 132, the control module 133 and the image integration module 134 to perform the processes described previously. During the selection of at least one of the plurality of objects 141, 142, 143 and 144 in the image 14 as an ROI, the coordinate calculation module 132 may carry out the selection of the ROI based on a weighted average of expected accuracy rates of the original 2D image and the 3D image. In an embodiment, the selection of the ROI is from a 2D image, a 3D image, or a combination thereof.

Figure 2:
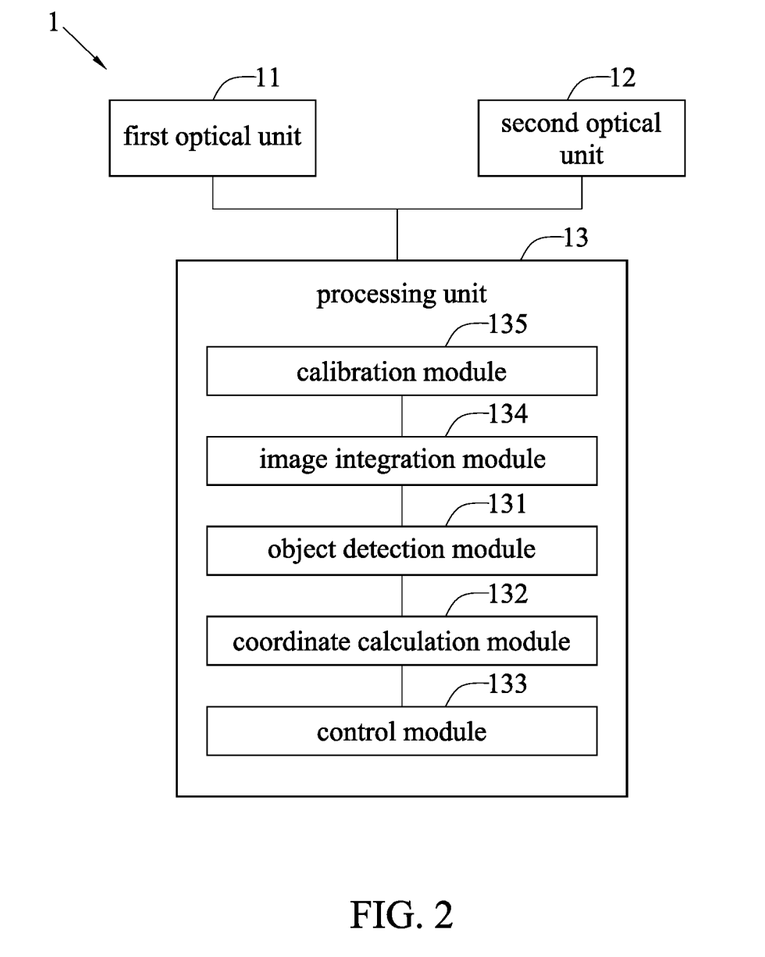
FIG. 2 is a block diagram depicting an image scanning system in accordance with a second embodiment of the present disclosure.

Referring to FIG. 2, another embodiment of the image scanning system 1 in accordance with the present disclosure is shown and described as follows.

The image scanning system 1 includes a first optical device 11, a second optical device 12 and a processing unit 13. The first optical device 11 is used for obtaining a first image in its field of view. The second optical device 12 is used for obtaining a second image in its field of view. The processing unit 3 is used for receiving and processing the first image or the second image. The processing unit 13 includes a calibration module 135, an image integration module 134, an object detection module 131, a coordinate calculation module 132, and a control module 133.

The calibration module 135 is used for calibrating the image information of the first image and the second image. For example, in the case that the first image is a 2D image and the second image is a 3D image, since the first image and the second image come from a camera and a 3D LiDAR sensor, respectively, the shooting angles and the coordinate systems used by the camera and the 3D LiDAR sensor are not the same, pre-processing is required. An algorithm used in the pre-processing can be a pinhole camera model; its formula is given below:

$$sm' = A[R \mid t]M' \text{ or } s\begin{bmatrix} \mu \\ v \\ 1 \end{bmatrix} = \begin{bmatrix} f_x & 0 & c_x \\ 0 & f_y & c_y \\ 0 & 0 & 1 \end{bmatrix} \begin{bmatrix} r_{11} & r_{12} & r_{13} & t_1 \\ r_{21} & r_{22} & r_{23} & t_2 \\ r_{31} & r_{32} & r_{33} & t_3 \end{bmatrix} \begin{bmatrix} X \\ Y \\ Z \\ 1 \end{bmatrix},$$

wherein (X, Y, Z) are coordinates of a 3D point in a world coordinate system, (μ,v) are coordinates of a projection point of a pixel, A is a camera matrix or inner parameter matrix, $(c_x, c_y)$ are main points in the centers of the images, and $(f_x, f_y)$ is the focal length exhibited in the pixel element. The present disclosure is not limited to this particular calibration formula, other formulae can be used, and the present disclosure is not so limited.

The calibrated image information of the first image and the second image are then provided to the image integration module 134 for processing. Through the calibrated image information of the first image and the second image, the same camera coordinates or a conversion relationship between their respective coordinate systems can be acquired, and the image integration module 134 is able to integrate the calibrated image information of the first image and the second image into a third image.

The object detection module 131 detects objects in the third image. The coordinate calculation module 132 selects at least one of the objects in the third image as an ROI, and calculates a relative coordinate. The control module 133 controls the second optical device 12 based on the relative coordinate so as to continuously scan the ROI in the third image to produce depth image information of the ROI.

After obtaining the depth image information, the image integration module 134 integrates the depth image information into the first image, the second image or the third image to obtain an image including high-resolution depth image information of the object for subsequent recognition. In turn, a more accurate result can be obtained. The integrated first, second or third image can then be provided to the object detection module, the coordinate calculation module, and the control module for a subsequent process.

In addition to the case that the first optical device 11 and the second optical device 12 are a camera and a 3D LiDAR sensor, respectively, in an embodiment, the first optical device 11 and the second optical device 12 can both be 3D LiDAR sensors, and the first image and the second image are both 3D images. Regardless of whether the first image is a 2D image and the second image is a 3D image, or the first image and the second image are both 3D images, the shooting angles and the coordinate systems used by the first optical device 11 and the second optical device 12 may be different from each other. In this case, before the first and second images can be utilized, pre-processing such as an algorithm based on the pinhole camera model has to be performed to convert them into the same coordinate systems. In other words, the image scanning system according to the present disclosure may acquire 3D images for processing, or a 2D image and a 3D image for processing.

Figure 7:
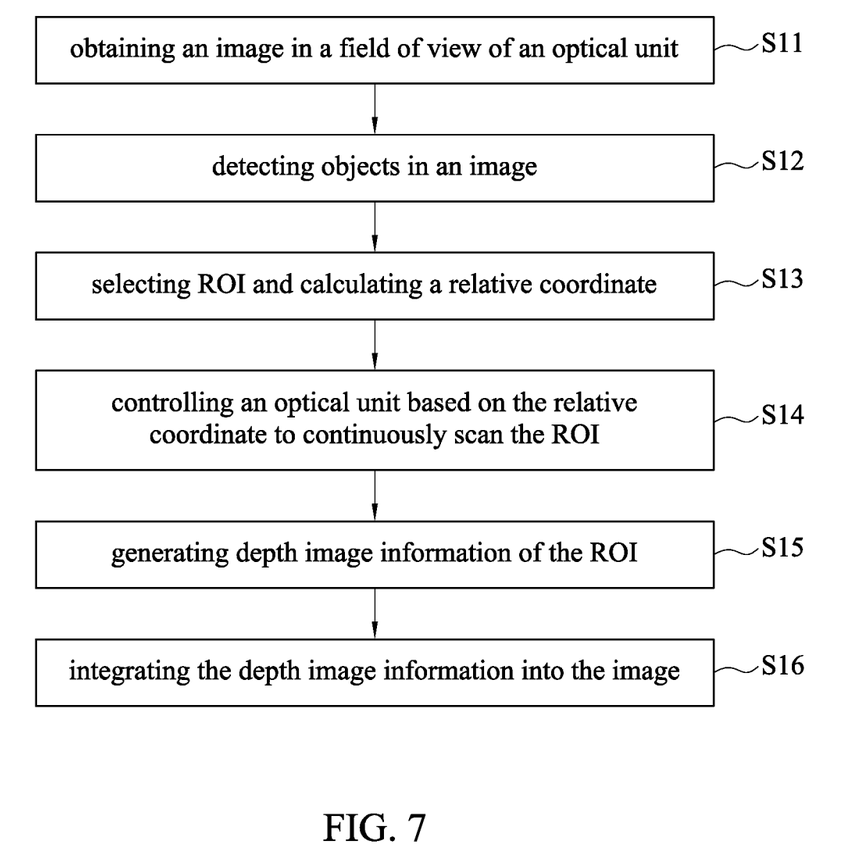
FIG. 7 is a flow chart of an image scanning method in accordance with an embodiment of the present disclosure.

Referring to FIG. 7, an image scanning method in accordance with an embodiment of the present disclosure is shown. Aspects of the image scanning method that are the same as those described with respect to the above image scanning system will not be repeated. The image scanning method first obtains an image in the field of view of an optical device (step S11), that is, a first image in the field of view of the first optical device and a second image in the field of view of the second optical device.

Next, in step S12, the object detection module of the processing unit detects objects in the first image or the second image, for example, using the HOV-based algorithm in conjunction with a SVM, a BOW, or a combination thereof, or in conjunction with a deep-learning algorithm such as an artificial neural network, AlexNet or R-CNNs; the present disclosure is not limited as such.

Upon detecting objects in the image, in step S13, the coordinate calculation module of the processing unit selects at least one of the objects in the first image or the second image as a ROI, and calculates a relative coordinate of the ROI with respect to the second optical device. Then, the image scanning process proceeds to step S14.

In step S14, the control module of the processing unit controls the second optical device based on the relative coordinate so as to continuously scan the ROI in the first image or the second image. Then, in step S15, the processing unit generates depth image information of the ROI in the first image or the second image.

Thereafter, in step S16, the image integration module of the processing unit integrates the depth image information into the first image or the second image to obtain an image including high-resolution depth image information of the object for subsequent recognition. In turn, a more accurate result can be obtained.

Figure 8:
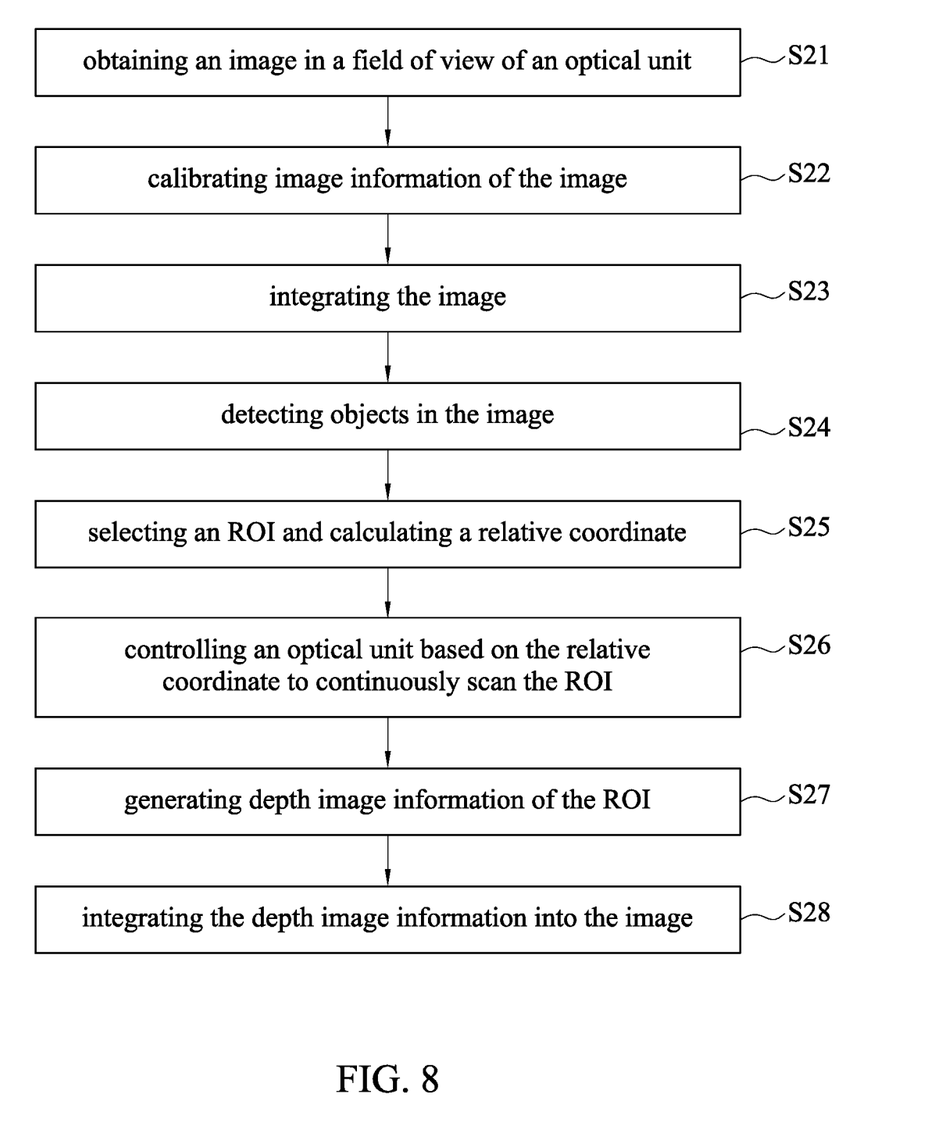
FIG. 8 is a flow chart of an image scanning method in accordance with another embodiment of the present disclosure.

Referring to FIG. 8, an image scanning method in accordance with another embodiment of the present disclosure is shown. Technical contents in steps S21 and S24-S28 are the same as the steps S11-S16 in FIG. 7 and the above image scanning system, further description thereof omitted. Only the differences are described below.

Upon obtaining the first image in the field of view of the first optical device and the second image in the field of view of the second optical device (step S21), a calibration process is performed to calibrate the image information of the images (step S22). In an embodiment, the calibration module of the processing unit calibrates the image information of the first image and the second image. For example, in the case that the first image is a 2D image and the second image is a 3D image, the first image and the second image are from the camera and the 3D LiDAR sensor, respectively, the shooting angles and the coordinate systems used by the camera and the 3D LiDAR sensor may be different, such that pre-processing has to be performed. To this end, an algorithm based on the pinhole camera model can be used, but the present disclosure is not limited thereto. Alternatively, in the case that both the first and the second images are 3D images, as the first and the second images are from different 3D LiDAR sensors, the shooting angles and the coordinate systems used by the camera and the 3D LiDAR sensor may also be different, such that pre-processing using an algorithm based on the pinhole camera model also has to be performed, but the present disclosure is not limited thereto. Then, the image scanning method proceeds to step S23.

In step S23, the calibrated first and second images are integrated. In an embodiment, with the calibrated image information of the first image and the second image, the same camera coordinates or a conversion relationship between their respective coordinate systems are obtained, and the image integration module of the processing unit integrates the calibrated image information of the first image and the second image into a third image. Then, the image scanning method proceeds to carrying out steps S24-S27, wherein objects of the image are detected, an ROI is selected and relative coordinates thereof are calculated, the ROI is continuously scanned by the optical device controlled based on the relative coordinate, and finally depth image information of the ROI is generated. Thereafter, the image scanning method proceeds to step S28.

In step S28, the depth image information is integrated into the first, the second or the third image to obtain an image including high-resolution depth image information of the object for subsequent recognition. In turn, a more accurate result can be obtained.

In summary, the image scanning system and image scanning method in accordance with the present disclosure scan an ROI in an image by using a 3D LiDAR sensor to increase the resolution of depth image information in the obtained ROI. Compared with the prior art, which scans all of the objects using the 3D LiDAR sensor, the present disclosure achieves higher resolutions and faster scanning speeds, and after the interested depth image information of higher resolution is further integrated into the image, a more accurate result can be obtained in a subsequent recognition process.

The above embodiments are only used to illustrate the principles of the present disclosure, and should not be construed as to limit the present disclosure in any way. The above embodiments can be modified by those with ordinary skill in the art without departing from the scope of the present disclosure as defined in the following appended claims.

What is claimed is:

1. An image scanning system, comprising:
a first optical device configured for obtaining a first image;
a second optical device configured for obtaining a second image; and
a processing unit configured for receiving and processing at least one of the first image and the second image, the processing unit including:
an object detection module configured for detecting one or more objects in the first image or the second image;
a coordinate calculation module configured for selecting at least one of the objects in the first image or the second image as a region of interest (ROI) and calculating a relative coordinate of the ROI with respect to the second optical device;
a control module configured for controlling the second optical device based on the relative coordinate to continuously scan the ROI in the first image or the second image, and allowing the processing unit to generate depth image information of the ROI in the first image or the second image; and
an image integration module configured for integrating the depth image information into the first image or the second image.

2. The image scanning system of claim 1, wherein the second optical device includes:
a laser light emitter configured for emitting laser light;
a reflector disposed in a path along which the laser light travels and configured for adjusting the path of the laser light for the laser light to be incident onto and reflected by the ROI in the first image or the second image; and
an image receiver configured for receiving the reflected laser light to generate the depth image information of the ROI in the first image or the second image.

3. The image scanning system of claim 2, wherein the control module is configured for controlling the reflector based on the relative coordinate to adjust the path of the laser light for continuously scanning the ROI in the first image or the second image.

4. The image scanning system of claim 1, wherein the image integration module is configured for integrating the first image and the second image into a third image or integrating the depth image information into the first image or the second image, and providing the third image or the first image or the second image into which the depth image information is integrated to the object detection module, the coordinate calculation module and the control module for a subsequent process.

5. The image scanning system of claim 4, wherein the processing unit further includes a calibration module configured for calibrating image information of the first image and the second image, and the image integration module is configured for integrating the first image and the second image with the calibrated image information into the third image.

6. The image scanning system of claim 4, wherein the image integration module is configured for further integrating the depth image information into the third image.

7. The image scanning system of claim 1, wherein the second optical device includes:
a laser light emitter configured for emitting laser light;
a solid state laser beam guider configured for adjusting a path of the laser light through using a liquid crystal waveguide or an optical phased array for the laser light to be incident onto and reflected by the ROI in the first image or the second image; and an image receiver configured for receiving the reflected laser light to generate the depth image information of the ROI in the first image or the second image.

8. The image scanning system of claim 7, wherein the control module is configured for controlling the solid state laser beam guider to adjust the path of the laser light based on the relative coordinate for continuously scanning the ROI in the first image or the second image.

9. The image scanning system of claim 1, wherein the second optical device includes an image receiver and an active scanning laser light emitter, and wherein the control module is configured for adjusting a path of laser light emitted through the active scanning laser light emitter based on the relative coordinate for the laser light to be incident onto and reflected by the ROI in the first image or the second image, and the image receiver is configured for receiving the reflected laser light to generate the depth image information of the ROI in the first image or the second image.

10. The image scanning system of claim 1, wherein at least one of the first optical device and the second optical device is a three-dimensional (3D) light detection and ranging (LiDAR) sensor, and at least one of the first image and the second image is a 3D image.

11. The image scanning system of claim 1, wherein the first optical device is a camera, the second optical device is a 3D LiDAR sensor, the first image is a two-dimensional (2D) image, and the second image is a 3D image.

12. An image scanning method, comprising:
obtaining a first image in a field of view of a first optical device and a second image in a field of view of a second optical device;
detecting, by an object detection module of a processing unit, one or more objects in at least one of the first image and the second image;
selecting at least one of the objects in the first image or the second image as a region of interest (ROI), and calculating, by a coordinate calculation module of the processing unit, a relative coordinate of the ROI with respect to the second optical device;
controlling, by a control module of the processing unit, the second optical device based on the relative coordinate to continuously scan the ROI in the first image or the second image, and allowing the processing unit to generate depth image information of the ROI in the first image or the second image; and
integrating, by an image integration module of the processing unit, the depth image information into the first image or the second image.

13. The image scanning method of claim 12, further comprising:
emitting laser light by a laser light emitter of the second optical device;
adjusting, by a reflector of the second optical device disposed in a path along which the laser light travels, the path of the laser light for the laser light to be incident onto and reflected by the ROI in the first image or the second image; and receiving, by an image receiver of the second optical device, the reflected laser light to generate the depth image information of the ROI in the first image or the second image.

14. The image scanning method of claim 13, further comprising controlling, by the control module, the reflector based on the relative coordinate to adjust the path of the laser light for continuously scanning the ROI in the first image or the second image.

15. The image scanning method of claim 12, further comprising, after the first image and the second image are obtained, calibrating, by a calibration module of the processing unit, image information of the first image and the second image.

16. The image scanning method of claim 15, further comprising, after the image information of the first image and the second image is calibrated, integrating, by the image integration module, the first image and the second image into a third image and providing the third image to the object detection module, the coordinate calculation module and the control module for a subsequent process, or after the depth image information is integrated into the first image or the second image, providing the first image or the second image into which the depth image information is integrated to the object detection module, the coordinate calculation module and the control module for a subsequent process.

17. The image scanning method of claim 16, further comprising, after the depth image information is generated, integrating the depth image information into the third image.

18. The image scanning method of claim 12, further comprising:
emitting laser light by a laser light emitter of the second optical device;
adjusting, by a solid state laser beam guider of the second optical device, the path of the laser light through using a liquid crystal waveguide or an optical phased array for the laser light to be incident onto and reflected by the ROI in the first image or the second image; and
receiving, by an image receiver of the second optical device, the reflected laser light to generate the depth image information of the ROI in the first image or the second image.

19. The image scanning method of claim 18, further comprising controlling, by the control module, the solid state laser beam guider to adjust the path of the laser light based on the relative coordinate for continuously scanning the ROI in the first image or the second image.

20. The image scanning method of claim 12, further comprising:
adjusting, by the control module, a path of laser light emitted through an active scanning laser light emitter of the second optical device based on the relative coordinate for the laser light to be incident onto and reflected by the ROI in the first image or the second image;
receiving, by an image receiver, the reflected laser light to generate the depth image information of the ROI in the first image or the second image.

* * * * *